(12) United States Patent
Neal et al.

(10) Patent No.: US 7,510,751 B2
(45) Date of Patent: Mar. 31, 2009

(54) MOLDING OF POLYPROPYLENE WITH ENHANCED REHEAT CHARACTERISTICS

(75) Inventors: Michael Anthony Neal, Martan (GB); David A. Harrison, Redcar (GB); Stephen Derek Jenkins, Stokesley (GB); J. Paul Davis, Billingham (GB)

(73) Assignee: INVISTA North America S.ar.l., Wilmington, DE (US)

( * ) Notice: Subject to any disclaimer, the term of this patent is extended or adjusted under 35 U.S.C. 154(b) by 0 days.

(21) Appl. No.: 11/877,762

(22) Filed: Oct. 24, 2007

(65) Prior Publication Data

US 2008/0042098 A1 Feb. 21, 2008

Related U.S. Application Data

(62) Division of application No. 10/387,600, filed on Mar. 13, 2003, now Pat. No. 7,303,795.

(51) Int. Cl.
*B29C 49/02* (2006.01)

(52) U.S. Cl. ............... 428/35.7; 264/535; 264/211.24; 264/322

(58) Field of Classification Search .............. 428/35.7; 264/535, 211.24, 322
See application file for complete search history.

(56) References Cited

U.S. PATENT DOCUMENTS

| | | | |
|---|---|---|---|
| 3,264,225 A | 8/1966 | Callahan | |
| 3,294,885 A | 12/1966 | Cines et al. | |
| 3,406,135 A | 10/1968 | Hecker et al. | |
| 3,492,151 A | 1/1970 | Cescon | |
| 3,891,599 A * | 6/1975 | Marciniak et al. | 524/412 |
| 3,951,886 A | 4/1976 | Miyake et al. | |
| 3,960,819 A | 6/1976 | Jones et al. | |
| 3,997,503 A | 12/1976 | Henman et al. | |
| 4,224,263 A | 9/1980 | Kontz | |
| 4,328,139 A | 5/1982 | Simons | |
| 4,408,004 A | 10/1983 | Pengilly | |
| 4,456,719 A | 6/1984 | Yamamoto et al. | |
| 4,476,272 A | 10/1984 | Pengilly | |
| 4,535,118 A | 8/1985 | Pengilly | |
| 4,963,086 A | 10/1990 | Wiatt et al. | |
| 5,121,828 A | 6/1992 | Wiatt et al. | |
| 5,185,163 A | 2/1993 | Wiatt et al. | |
| 5,286,540 A | 2/1994 | Suga et al. | |
| 5,419,936 A | 5/1995 | Tindale | |
| 5,456,719 A | 10/1995 | Keller | |
| 5,529,744 A | 6/1996 | Tindale | |
| 5,620,650 A | 4/1997 | Nakajima et al. | |
| 5,679,306 A | 10/1997 | Nakajima et al. | |
| 5,798,433 A | 8/1998 | Schmidt et al. | |
| 5,886,088 A | 3/1999 | Matsumoto et al. | |
| 5,925,710 A | 7/1999 | Wu et al. | |
| 5,941,054 A | 8/1999 | Valyi | |
| 6,022,920 A | 2/2000 | Maxwell et al. | |
| 6,034,167 A | 3/2000 | Tung et al. | |
| 6,159,567 A | 12/2000 | Charlier et al. | |
| 6,197,851 B1 | 3/2001 | Maxwell et al. | |
| 6,200,659 B1 | 3/2001 | Fujimori et al. | |
| 6,258,313 B1 | 7/2001 | Gottlieb et al. | |
| 6,503,586 B1 | 1/2003 | Wu et al. | |
| 2002/0086970 A1 | 7/2002 | Hyun Nam Cho et al. | |

FOREIGN PATENT DOCUMENTS

| | | |
|---|---|---|
| EP | 0 429 311 B1 | 5/1991 |
| EP | 429311 B1 * | 1/1998 |
| WO | WO 99/48775 | 9/1999 |

\* cited by examiner

*Primary Examiner*—Robert D. Harlan
(74) *Attorney, Agent, or Firm*—Craig M. Sterner (57) ABSTRACT

Bottles, containers and other articles are formed from polypropylene compositions that include a reheating agent, such as antimony, carbon black, graphite, titanium, copper, manganese, iron, tungsten, graphite, infra-red absorbing dyes or other infra-red absorbing material. The reheating time for the polypropylene composition is shortened for injection stretch blow molding or thermoforming, and the polypropylene granule composition with reheating agent has an L* value of at least 80% of the L* value for a polypropylene granule control without added reheating agents as measured by the Gardner color test. The reheating agent may be incorporated into the polypropylene composition by in situ chemical reduction of a metal compound, such as antimony triglycolate, with a reducing agent, such as hypophosphorous acid. In addition, the polypropylene composition with reheating agent may be derived from a polypropylene masterbatch with high concentrations of reheating agent.

14 Claims, 4 Drawing Sheets

MOLDING OF POLYPROPYLENE WITH ENHANCED REHEAT CHARACTERISTICS

CROSS REFERENCE TO RELATED APPLICATION

This application is a division of U.S. patent application Ser. No. 10/387,600 filed Mar. 13, 2003 now U.S. Pat. No. 7,303,795.

FIELD OF THE INVENTION

This invention relates to the manufacture of bottles, containers and other articles from polypropylene polymer compositions, in particular by injection stretch blow molding and thermoforming techniques.

BACKGROUND OF THE INVENTION

Polyester compositions, such as polyethylene terephthalate or copolymers thereof (hereinafter collectively referred to as "PET"), are well known packaging materials. For example, in U.S. Pat. No. 4,340,721, a PET composition is used to manufacture beverage bottles and other containers (hereinafter referred to as "bottles") by various molding methods.

In current practice PET bottles of the size and shape for most beverage applications are usually made by an injection stretch blow molding technique. Injection stretch blow molding has two main steps. First, the PET, in the form of granules, is melted in an injection molding machine and the melt injected into a cooled mold to form a precursor to the final bottle known as a "preform". Commonly, the preform has a threaded neck with a shortened bottle body shape length about 8 to 20 cm and a material thickness between 3 mm and 6 mm, Second, the preform is transferred to a stretch blow molding machine where its external surfaces are reheated by infra-red (IR) lamps. Once the preform has reached a desired temperature, it is stretched and blown to form the final bottle.

The time it takes to reheat the preform is the rate-limiting factor for the overall process. The preform starts at ambient temperature and has to be heated to above the glass transition temperature of the polyester (generally to about 110° C.) so that the preform becomes sufficiently flexible to permit the stretch-blow step to work. In general, polyester polymers have a poor ability to absorb IR radiation. Hence, as well as extending the overall production time, the preform reheating step also requires a significant amount of energy. To address this problem, certain prior patents have taught that adding black materials and/or metal particles to PET compositions can reduce the time and energy required for reheating. Hence, prior patents teach adding carbon black (U.S. Pat. No. 4,476,272), iron oxide (U.S. Pat. No. 4,250,078), and antimony and other metal particles (U.S. Pat. Nos. 5,419,936 and 5,529,744) to reduce PET preform reheating time. Antimony metal particles were indicated as preferred because such particles preferentially absorb radiation at or near the infra-red wavelengths emitted by the IR lamps in most stretch blow mold machines, e.g., 500 nm to 2000 nm. Furthermore, as described in U.S. Pat. Nos. 5,419,936 and 5,529,744, antimony compounds are usually present in the polyester composition itself (as the catalyst for melt polymerization) and can be converted to antimony metal particles, with the desired IR absorption characteristics, by the addition of a reducing agent in the melt polymerization stage of manufacture.

Although PET has found widespread application for beverage bottles, the cost of raw materials for making PET is much higher than for some non-PET polymers. Therefore, the industry continually seeks to switch from PET to lower cost alternatives. Whilst seeking these alternatives, container manufacturers do not wish to invest substantial resources in new capital equipment to process a new polymer material, but would prefer to adapt their existing PET injection blow molding equipment for use with the new material.

One possible alternative to PET for use in injection stretch blow molding of beverage bottles is polypropylene. U.S. Pat. No. 6,258,313 teaches that injection stretch blow molding of a polypropylene preform is possible if the preform is heated simultaneously both from the outside and inside. Nevertheless, it has heretofore been more difficult to produce satisfactory beverage bottles from polypropylene by this method. First, polypropylene has a lower density and specific heat than PET and hence exhibits a significantly narrower processing window. Second, polypropylene suffers from the same limitations as PET in terms of its poor ability to absorb IR radiation. Furthermore, polypropylene generally has greater opacity than PET, which detracts from its aesthetic appearance. The industry thus continues to seek ways to improve the IR absorption properties of polypropylene such that it can be used to make beverage bottles on the same injection stretch blow molding equipment as PET and/or used to make other thermoformed articles.

SUMMARY OF THE INVENTION

In a first aspect, the invention is a method for injection stretch blow molding a polypropylene bottle from a preform that comprises a polypropylene composition containing a reheating agent. The reheating agent may be one or more metal particles of antimony, titanium, copper, manganese, iron and tungsten, where antimony is most preferred. The reheating agent also may be particles of carbon black, graphite, infra-red absorbing dyes or other infra-red absorbing material.

The preform is reheated, usually by heating with one or more heating lamps, to a desired reheat temperature. The time for reheating the preform is shorter than the time for reheating a control preform of equivalent dimensions formed from the polypropylene composition without a reheating agent. The polymer granules used to make the preform have an L* value of at least about 80% of an L* value of the polymer granules used to make the control preform. The L* values are measured by the Gardner color test. For example, where the control polypropylene composition granules have an L* value of about 75, the granules used to manufacture the preform according to the invention have an L* value of about 60 or above. The closer the L* value is to the L* value of the control, the more the final bottle will resemble the color/aesthetics of a bottle made from the control polypropylene.

Preferably, the reheating agent is incorporated into the polypropylene in the form of particles having particle sizes in the range of about 10 nanometers (nm) to about 100 micrometers, and more preferably in the range of 10 nm to 10 microns. Preferably, the reheating agent particles are incorporated into the polypropylene in an amount in the range of about 2 ppm to 1000 ppm, more preferably from 2 ppm to 350 ppm, most preferably from 2 ppm to 50 ppm. The reheating agent particles also may be incorporated into the polypropylene composition in the form of particles having sizes in the range of 10 nm to 100 microns and in an amount in the range of 50 ppm to 25,000 ppm to form a polypropylene masterbatch. The masterbatch then may be blended with other polypropylene compositions (possibly free of reheating agents or containing different reheating agents or different proportions of the same reheating agents) to form a polypropylene composition with desired proportion(s) of reheating agent(s).

In addition, the reheating agent may be generated within the polypropylene composition by in situ chemical reduction of a metal compound with a reducing agent.

Thus, the metal compound can contain one or more of antimony, titanium, copper, manganese, iron and tungsten, and the reducing agent can be one or more organic phosphorous acids or inorganic phosphorous acids, or tannic, gallic, and pyrogallic acids, or hydrazine, or sulphites, or tin II salts, nickel hydroxide or any organic or inorganic compound with an electrochemical potential sufficient to reduce the metal compounds to the metallic state. Preferably, the metal compound is antimony triglycolate and the reducing agent is hypophosphorous acid.

The preforms, polypropylene bottles and other polypropylene articles made from the polypropylene compositions with reheating agents are also claimed. Examples of other polypropylene articles include three-dimensional articles, such as cups or serving trays or food containers, and two-dimensional articles, such as sheets. Depending upon the desired aesthetics of the final articles, the L* values for the polypropylene granules with reheating agents used to form these other polypropylene articles may be outside the preferred range for L* for compositions used to form bottle preforms that are injection stretch blow molded into bottles.

BRIEF DESCRIPTION OF THE DRAWINGS

The present invention will be described in the following detailed description with reference to the following drawings.

DETAILED DESCRIPTION OF THE PREFERRED EMBODIMENTS

The present invention is directed to polypropylene compositions that are useful in the production of stretch blow molded containers, particularly bottles, with good color quality and transparency. Such compositions may also be used to make other polypropylene containers and polypropylene articles with other two-step techniques, such as thermoforming. The polypropylene compositions contain as reheating agents certain metal particles that intrinsically absorb radiation in the wavelength region of 500 nm to 2000 nm, which are the typical wavelengths of the radiation from infra-red lamps used in IR heating in PET injection stretch blow molding. The metal particles are present in sufficient amount to reduce the reheating time that would otherwise be required to reheat a preform of a polypropylene composition to the desired temperature during injection stretch blow molding or thermoforming. Such polypropylene compositions with reheating agents still have acceptable color and clarity for the desired end use applications.

Figure 1A:
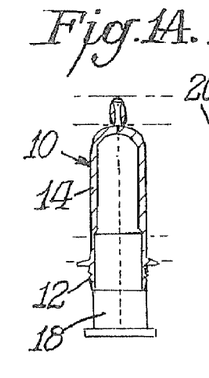
FIGS. 1A to 1D are schematic diagrams of the typical steps in an injection stretch blow molding method for bottle making.

Referring first to FIGS. 1A to 1D, a known injection stretch blow molding method involves certain steps. First, an injection molded preform 10 as shown in FIG. 1A has a threaded neck portion 12 and a bottle body portion 14. The preform 10 is injection molded from either a polypropylene composition containing reheat agents or from a reheat agent concentrate masterbatch of granules that are mixed with polymer granules without reheat agents. Most commonly, each polypropylene granule is from 2.5 to 4.0 mm long and 2.0 to 3.0 mm in diameter. The polypropylene composition or mixture of polypropylene granules is heated to melt the composition/granules to form a flowable polymer melt that is introduced by injection into the mold. The injection mold has a cavity and a mating ram to form the preform into the desired contoured shape. The preform 10 is removed from the mold, cooled and stored until it is ready to be formed into a bottle.

Figures 1B, 1C:
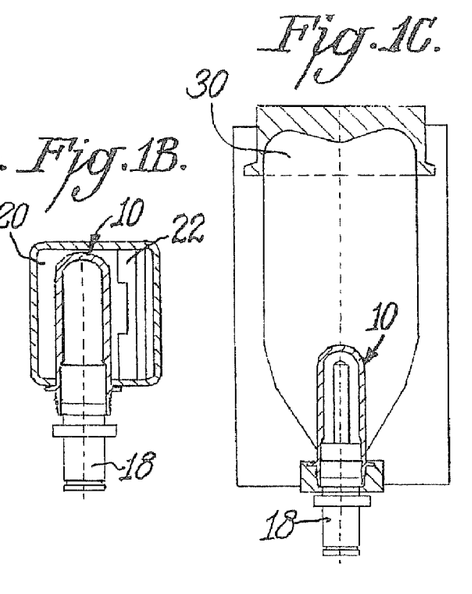

As shown in FIG. 1B, the preform 10 is then installed over a fixture 18 and held within a reheating or preheating cavity 20. Heating lamp 22, which may be one or a series of lamps, emits infra-red radiation that heats the outer surface of the preform 10 as the preform 10 is rotated on the fixture 18. The reheating can be conducted from the outside of the preform as shown in FIG. 1B, from the inside of the preform, or from both the outside and the inside of the preform, although heating just from the outside is the most common technique when forming PET bottles.

Figure 1D:
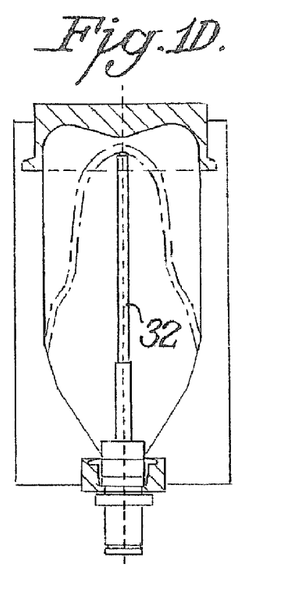

When the preform 10 reaches a desired temperature, the reheated preform 10 is then ready for stretch blow molding. Referring next to FIGS. 1C and 1D, the fixture 18 with the reheated preform 10 is held within a mold cavity 30 having the contours to mold the polymer material into a bottle. A gas, such as air or nitrogen, is injected into the internal volume of the preform 10 through a nozzle in the fixture 18 as a push rod 32 urges the polymer material to expand outwardly to conform to the internal contours of the mold. Once the injection stretch blow molding has been completed, the finished bottle (not shown) is removed from the mold. In one aspect, the present invention concerns injection stretch blow molding of polypropylene compositions using the equipment now commonly used by industry for injection stretch blow molding of PET.

Reheating agents added to the polypropylene composition to reduce reheating time according to the invention include antimony (Sb), manganese (Mn), iron (Fe), carbon black, graphite, infra-red dyes, titanium (Ti), tungsten (W), and copper (Cu). Antimony and carbon black are preferred reheating agents, and antimony is particularly preferred. The reheating agents preferably are added to the polypropylene composition in amounts from about 2 ppm to about 1000 ppm, more preferably about 2 ppm to 350 ppm, and most preferably from about 2 ppm to 50 ppm, and with particle sizes in the range of about 10 nm to about 100 microns, most preferably in the range 10 nm to 10 microns.

The reheating agents may be incorporated into the polypropylene compositions in a number of ways. As one alternative, the reheating agents may be directly mixed with the polypropylene granules prior to introducing the mixture to an injection mold to form the preform. As another more preferred alternative, the reheat agents can be directly mixed with the polypropylene granules and passed through a twin screw compounding extruder or similar piece of equipment to form a well dispersed and distributed polypropylene compound before being introduced to an injection moulding machine. As an alternate more preferred alternative, the reheating agents can be generated within the polypropylene composition by in situ chemical reduction of a metal compound with a reducing agent. As a fourth and even more preferred alternative, the reheating agents can be incorporated into the polypropylene composition by one of the alternatives above, but in high concentrations to form masterbatch granules. Then, such masterbatch granules may be blended with polypropylene granules having a different concentration of reheating agent or no reheating agent or a concentration of a different reheating agent to form a desired polypropylene composition containing one or more reheating agents in desired concentrations. For example, the polypropylene masterbatch may incorporate reheating agent(s) in the form of particles having sizes in the range of 10 nm to 100 microns, preferably less than 10 microns, and in an amount in the range of 50 ppm to 25,000 ppm, preferably less than 1250 ppm.

The degree of reheating agent distribution and dispersion in the polypropylene composition affects the reheating efficacy. That is to say, the more evenly distributed and more widely dispersed the reheating agents in the polymer, the better the reheating efficacy. Similarly, better distribution and dispersion of reheating agents in the polymer improves the aesthetics of the polymer.

In one of the more preferred embodiments, the reheating agent is formed by an in situ chemical reduction of a metal compound with a reducing agent. The metal compound preferably contains one or more of antimony, titanium, copper, manganese, iron and tungsten, and the reducing agent preferably is selected from the group consisting of one or more of organic phosphorous acids, inorganic phosphorous acids, tannic, gallic, and pyrogallic acids, hydrazine, sulphites, tin II salts and nickel hydroxide, or any organic or inorganic compound with an electrochemical potential sufficient to reduce the metal compounds to the metallic state.

Antimony as reheating agent preferably is formed by an in situ chemical reduction of an antimony compound with a reducing agent, such as hypophosphorous acid or other organic phosphorous acid or inorganic phosphorous acid. Preferred antimony compounds include antimony triglycolate (ATG), antimony triacetate (ATA) or antimony trioxide (ATO). The hypophosphorous acid reduces antimony compounds to antimony, which is dispersed in the polypropylene composition. The antimony particles appear to be more uniformly dispersed when introduced into the polypropylene composition in this manner. In particular, we discovered that the antimony particles deposited by the reaction of ATA, ATO or ATG with hypophosphorous acid and/or phosphorous acid have a particularly favorable particle size and are particularly well dispersed in the polypropylene.

The present invention provides a method of making polypropylene containers, such as bottles, and other polypropylene articles that have aesthetic characteristics close to polypropylene compositions without reheating agents. At the same time, the method also reduces the energy requirements for reheating compared to polypropylene compositions without reheating agents. One immediate advantage is cost savings though reduced cycle time or energy savings. Yet another advantage of the present invention is that polypropylene can be used at a higher temperature than PET in subsequent processing, such as pasteurization or cleaning. In addition, polypropylene is recyclable to the same extent as PET.

The following examples further illustrate the present invention. All parts and percentages are expressed by weight unless otherwise specified.

EXAMPLES

Two methods for measuring the reheat temperature were used to assess reheating times for polypropylene compositions containing different reheating agents. First, injection molded plaques were formed from the polypropylene compositions and through heat times for such plaques were measured according to the procedure described below. Second, plaques were molded from the polypropylene compositions and surface reheat times for such plaques were measured according to the procedure described below.

Preparing the Polypropylene Masterbatch Compositions.

Polypropylene polymer granules with a size of about 2.5 to 4.0 mm in length and 2.0 to 3.0 mm in diameter were mixed with reheating agents according to the following steps. First, about 5-7 kg polypropylene polymer was mixed with liquid paraffin (about 20 ml) in a plastic bag. The polymer in the bag was tumbled to coat the polymer granules with a thin film of oil. Next, the reheating agents were added to the bag and the admixture was tumbled again. Then, the coated polypropylene polymer granules were compounded using an APV MP2030 twin screw extruder, followed by a Boston Mathews single screw extruder fitted with a 4-section cavity transfer mixer. The resultant compound was then injection molded to form plaques for further testing.

Procedure for Measuring Plaque through Heating Temperature.

Polypropylene plaque through heating temperature measurements were made as follows:

A polypropylene plaque of one hundred millimeters (100 mm) in diameter and four millimeters (4 mm) in cross-sectional thickness was used to evaluate the reheating time for various polypropylene compositions. Each polypropylene plaque of a polymer composition containing a reheating agent and each plaque of the corresponding control composition were made by a standard injection molding method using NB90 Negri Bossi 90te injection molding equipment available from Negri Bossi of Milan Italy. All of the sample and control plaques were made to exactly the same dimension—100 mm in diameter and 4 mm in cross-sectional thickness. The plaques were clean and free of surface contaminants, and had flat upper and lower surfaces.

Figure 2:
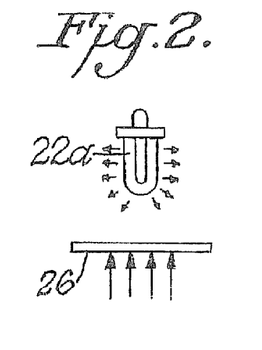
FIG. 2 is a schematic diagram showing an apparatus for heating a polymer plaque with a single IR lamp, which apparatus may be used to determine the through heating time of the polymer.

As illustrated schematically in FIG. 2, a single IR radiation lamp 22a, which is a 300 watt bulb made by Phillips, was positioned to heat one side of the plaque 26. A series of flat thermocouples were positioned on the opposite side of the plaque 26 to measure the radiated and conducted temperature. The temperature measuring device was a TC-08 8 channel thermocouple data logger from Pico Technology Limited of The Mill House, Cambridge Street, St. Neots, PE19 1QB, and the temperature measuring software was a Pico Technology Limited proprietary program supplied with the TC-08 unit. The plaque was 165 mm below the bottom of the infra-red lamp. This test method reflects the amount of heat transferred through the plaque from the heated side. The temperature was recorded as the mean of five measurements on five different plaques from each test sample and from a standard control plaque. We believe data from this plaque through-heat method represents more realistically the heat transfer and distribution in an article, such as a preform, which is processed by a typical injection stretch blow molding method, or for an article which is processed by a reheating method followed by physical forming, such as thermoforming.

The measuring apparatus was calibrated by using control plaques with a defined composition. These control plaques were tested repeatedly and showed consistent reheat measurements. Then, the reheating times for plaques that were tested for comparison were expressed in reference to the control. Two measurements were used: (1) time (seconds) to heat the plaque to 80° C.; and (2) temperature of the plaque after 300 seconds heating time. We have found that for proper comparison the plaques used in this method should have the same starting ambient temperature. Newly molded plaques should be cooled down to room temperature for a sufficient amount of time before testing. In our tests, freshly molded plaques were allowed to cool down at room temperature for at least 30 minutes before the reheating test was conducted.

Figure 4:
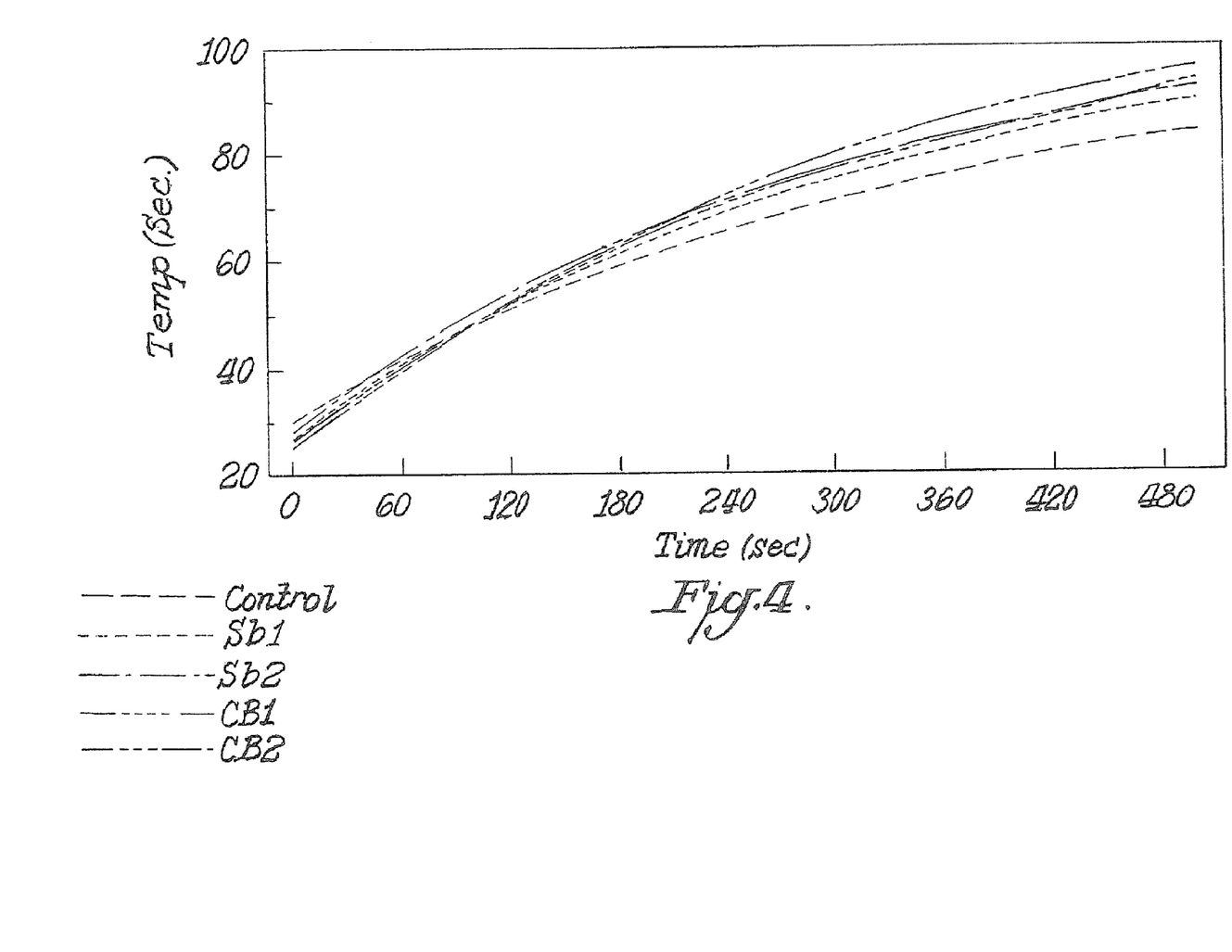
FIG. 4 is a graph of data showing the variation in the time required to through heat a polypropylene plaque to a target temperature (i.e., 80° C.) in relation to the amount of reheat agent in the polypropylene composition forming the plaque.
Figure 5:
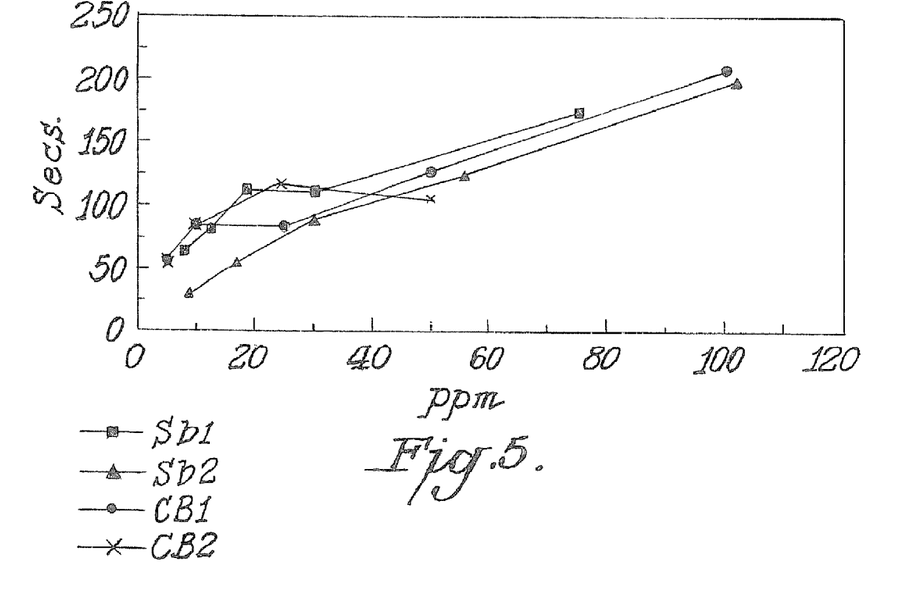
FIG. 5 is a graph of data comparing reheat time (seconds to 80° C.) versus the amount of reheat agent added to the polypropylene compositions forming the plaques.
Figure 6:
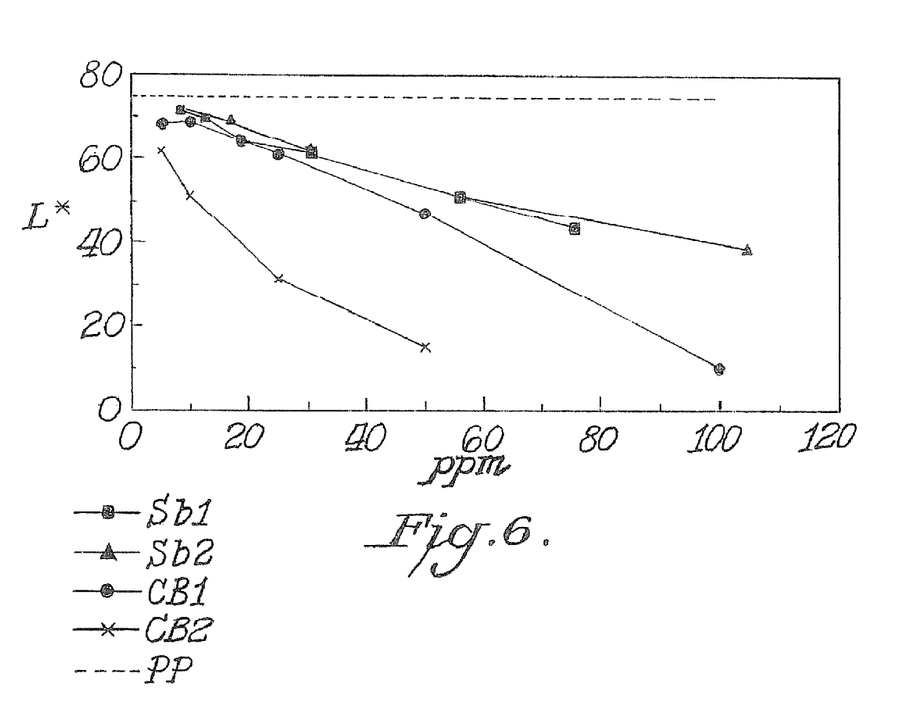
FIG. 6 is a graph of data comparing L* (for degree of color) versus the amount of reheating agent added to the polypropylene compositions forming the plaques.

Referring to FIGS. 4, 5 and 6, the reheating profiles for plaques formed from a polypropylene control and from polypropylene compositions containing different amounts of antimony or carbon black were evaluated.

For the reheating test in FIG. 4, the compositions tested were: Sb1: 25 ppm antimony formed by reducing reaction of equal parts by weight of antimony triglycolate and hypophosphorous acid; Sb2: 25 ppm antimony metal (milled) of particle size range 600 nm-2 microns; CB1: 25 ppm of 40 nm carbon black; and CB2: 25 ppm of larger particle size 6-30 microns carbon black. The reheating agents were all used in the same amount, 25 ppm, based on the weight of the polypropylene. As shown in FIG. 4, the polypropylene plaques that incorporated reheating agents all reheated more rapidly than the control polypropylene without reheating agents. All reached a desired 80° C. reheating temperature within 300 to 360 seconds, whereas the control took more than 480 seconds to reach this reheating temperature, which represents a 30% to 35% or better reduction in the reheating time.

FIGS. 5 and 6 compare the reheat time to 80° C. for the control and polypropylene containing antimony or carbon black in varying amounts. In FIGS. 5 and 6, the reheating agents were: Sb1: 10 ppm as Sb formed using equal parts by weight antimony triglycolate and hypophosphorous acid; Sb2: 25 ppm antimony metal (milled); CB1: 40 nm carbon black; and CB2: larger particle size 600 nm-2 microns carbon black. While both antimony and carbon black can effectively reduce the reheating time (FIG. 5), the carbon blacks at low levels can result in a significantly darker coloration (L* significantly below 60 where the control L* was 75) (FIG. 6), which can aesthetically detract from its use as a reheating agent for polypropylene compositions. The combination of antimony triglycolate and hypophosphorous acid resulting in an antimony content in the polypropylene of from 2 to 350 ppm, most preferably from 10 to 30 ppm, was particularly effective.

Introducing reheating agents in polypropylene compositions can result in undesired coloration of the final container, article or bottle product. The extent of coloration induced by reheating agents varies depending on the type and the amount of agents used. For a given reheating agent, the less amount of the agent is used, the less coloration will be in the final product. If the amount of the reheating agent used is low enough to minimize the unwanted coloration to an accepted level, that amount may not be sufficient to reduce reheating time. The challenge, therefore, is to find a reheating agent that can effectively reduce the reheating time and still produce a final container, article or bottle with minimum coloration.

We used a color measurement (L*) from the Gardner colorimeter to evaluate coloration of polypropylene compositions caused by different reheating agents. The color measurement (L*) reflects the absorption and scattering of light by the testing material. The Gardner BYK Color-View spectrophotometer Model No. 9000 is available from BYK Gardner, Inc., Columbia, Md. USA. L* values for polypropylene plaques made from polypropylene compositions containing different reheating agents in different amounts were measured.

The L* measurements shown in FIG. 6 illustrate the relationship between the coloration of polypropylene plaques and the amount of reheating agents in the polypropylene compositions from which the plaques were made. The control plaque was polypropylene without adding reheating agents. The control plaque had an L* value of about 75. The lesser coloration a polypropylene composition has, the closer its L* value is to that of the control. As shown in FIG. 6, the polypropylene composition with 10 ppm antimony (composition Sb1) had the aesthetic characteristics that are the closest to those of the polypropylene without any reheating agents (control). In these examples, the samples having L* values of about 60 and above as compared to L* of about 75 for the polypropylene control had color aesthetics that were at least 80% of the L* value of the control.

Table 1 below summarizes the energy savings due to the reduction of reheating time and the relative color aesthetics of these certain tested polypropylene compositions.

TABLE 1

Energy Savings and Aesthetics of Reheating Agents in Blowing Trials.

Blowing Trial 1

| | Reheating Agent Level (ppm) | Energy Saving (%) | Aesthetics (L*) (Granules) |
|---|---|---|---|
| Control | 0 | 0 | 75.71 |
| Sb1 | 10 | 10 | 68.31 |
| CB1 | 10 | 20 | 51.58 |

Blowing Trial 2

| | Reheating Agent Level (ppm) | Cycle time Saving (%) | Aesthetics (L*) (Granules) |
|---|---|---|---|
| Control | 0 | 0 | 73.94 |
| Sb1 | 10 | 24 | 65.26 |
| Sb2 | 10 | 24 | 63.79 |
| CB1 | 5 | 24 | 59.96 |
| CB1 | 10 | 31 | 47.74 |

Sb1: antimony (as described above);
Sb2: antimony (as described above)
CB1: 40 nm carbon black (as described above).

Blowing Trial Details.

The preforms for the blowing trial were made on a laboratory scale combined injection moulding and blowing machine. The preforms were injection moulded with typical polypropylene processing conditions—the melt temperature was 220° C., the mould temperature was 15° C., and the cycle time was 27 seconds. We then used a separate laboratory blowing machine which had been designed specifically for polypropylene. This blowing machine had two heating ovens, each having 10,000 watts heating capacity and each fitted with forced air ventilation. Several spinning preform holders were used to index the preforms through two ovens separated by an air gap. Each preform was indexed through the first oven in about 60 to 80 seconds. Then, the preform was indexed through an air space to allow the heated preform to equilibrate for about 60 to 80 seconds. Next, the preform was indexed through a second oven for about 60 to 80 seconds, and then, after a further 10-second period indexing in air, it was delivered to the blowing station.

For the energy saving experiment, the machine indexing speed was set at a constant 750 bottles per hour output, and the oven settings were adjusted (reduced) for each sample to provide an optimum injection moulded bottle. Energy savings were then calculated based on the lesser amount of heating energy required to reheat the bottles formed from a polypropylene composition that contained reheating agents versus the amount of heating energy required to reheat the control bottle. In Table 1, energy savings are expressed as a percentage.

For the cycle time saving experiment, both ovens were set to a constant 8900 watts output (for a combined 17,800 watts output). The cycle time was then increased until the preforms were heated sufficiently to allow the optimum blowing of the bottle. The increased cycle time of each sample was calculated against the control cycle time and expressed as a percentage.

The results in Table 1 indicate that the use of 10 ppm Sb produced from antimony triglycolate with hypophosphorous acid reduced the preform reheating energy and cycle time to the same level as 5 ppm carbon black, but the color and visual aesthetics of the polypropylene granule containing antimony was much better than the granules that contained carbon black. Thus, the resulting bottles formed from the polypropylene composition with antimony had better color and visual aesthetics than did the bottles formed from the polypropylene composition containing 5 ppm or 10 ppm carbon black.

The preforms with reheating agents as compared to the control preforms produced energy savings in the range of about 10% to 30%, preferably 15% to 20%, and cycle time savings in the range of about 25% to 35% (see Table 1). Thus, the polypropylene compositions with reheating agents shorten reheating time and still produce bottles with acceptable color and visual aesthetics.

We further explored the reheating and aesthetic characteristics of different types of antimony reagents. More specifically, we tested antimony triglycolate, antimony trioxide and antimony triacetate at different concentrations. We additionally explored the reheating and aesthetic characteristics of other reheating agents. We also tested different methods for mixing the reheating agents with the polypropylene, namely, by direct application to the polypropylene granules, and by mixing polypropylene granules with masterbatch granules containing high concentrations of reheating agents. For reducing agents, different phosphorous acids with different dosages were also tested. See Tables 2 and 3 below for a summary of these results.

We found that adding antimony as a reheating agent was preferred to carbon black in view of the aesthetics. We further found that adding antimony compounds in combination with phosphoric acid, preferably hypophosphoric acid, more thoroughly disperses the metal particles in the polypropylene composition. Lastly, the antimony triglycolate, antimony trioxide or antimony triacetate with hypophosphoric acid combinations that resulted in from 2 ppm to 350 ppm antimony metal particles in the polypropylene composition achieved the best results for reheat performance and color aesthetics.

Procedure for Measuring Plaque Surface Reheat Temperature.

Plaques injection molded from polypropylene compositions as specified in Tables 1, 2 and 3 were rotated while heated by radiation emitted by an IR heating lamp (a 175 Watt lamp model IR-175C-PAR from Phillips at 2400° K) (See, e.g., FIG. 2A). An infra-red pyrometer (model number Cyclops 300AF from Minolta Land) (not shown in FIG. 2) was positioned on the opposite side of the plaque with respect to the IR lamp. The surface temperature of the plaque was monitored and recorded during reheating.

The plaques tested contained various reheating agents, such as antimony (Sb), manganese (Mn), iron (Fe), titanium (Ti), tungsten (W), copper (Cu), graphite, infra-red dye and carbon black, in various amounts. The results are reported in Tables 2 and 3 below. For the compositions set forth in Tables 2 and 3, the controls were plaques made from polypropylene without reheating additives. All of the reheating agents tested improved the plaque surface reheating time as compared with the control polypropylene. However, certain of the reheating agents when incorporated into polypropylene granules (and plaques) had L* values much lower than the target L* (80% of the control), and thus may not be as suitable for use in injection stretch blow molding of bottles. These compositions still may have utility when making other polypropylene articles with thermoforming techniques.

Figure 3:
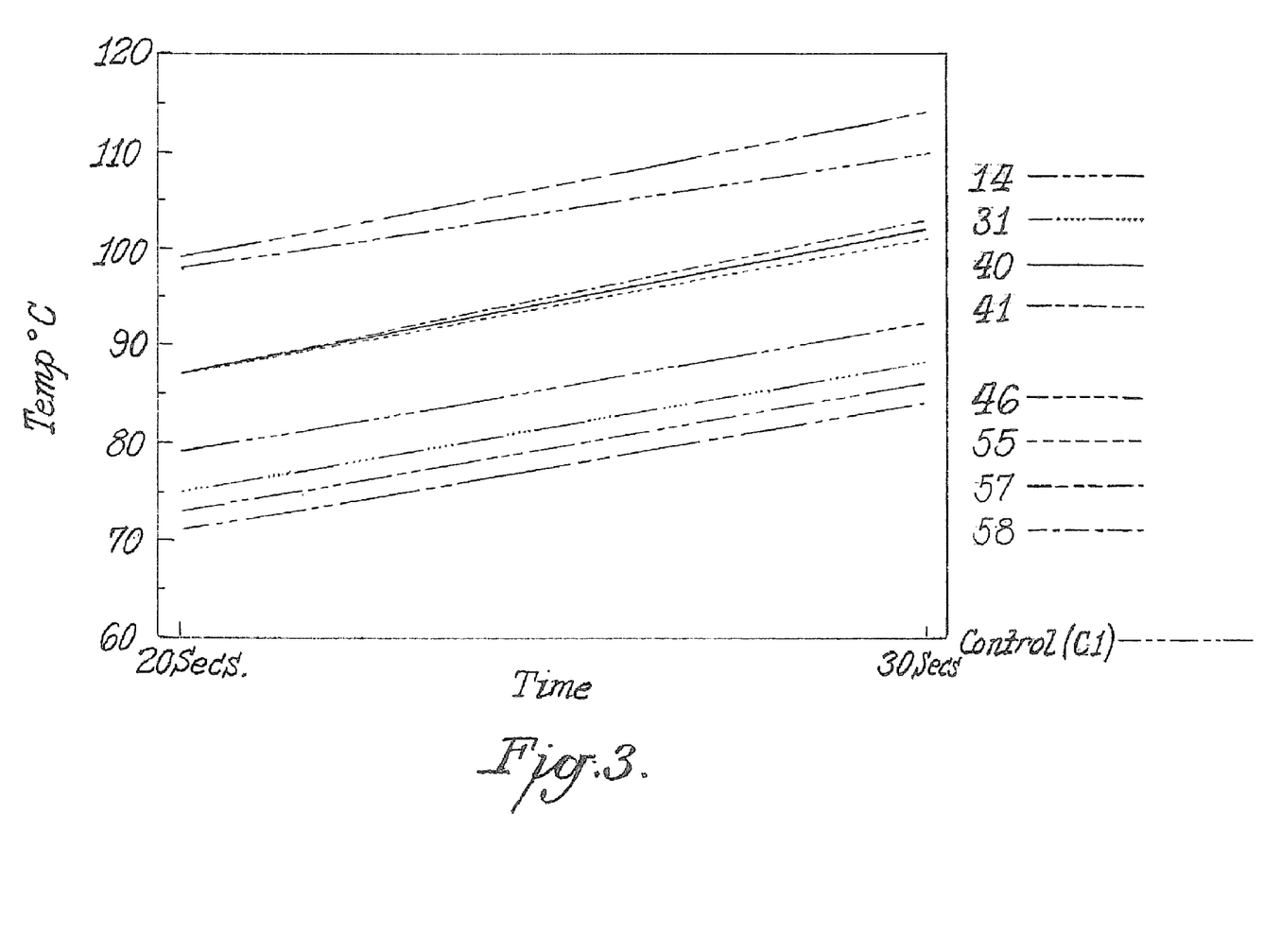
FIG. 3 is a graph of plaque temperature data over reheating time for plaque surface reheat experiments conducted with plaques formed with different polypropylene compositions.

Data for surface reheating times for certain of the polypropylene compositions that included reheating agent, compared to the control C1, is shown graphically in FIG. 3.

TABLE 2

Comparison of L* and Reheating Characteristics

| Sample No. | Target Formulation | Control Polymer | Granule L* | Plaque L* | Through-heat to 80° C. (sec) | Through-heat in 300 secs (° C.) |
|---|---|---|---|---|---|---|
| C1 | Eltex PPC KV 276 Control A | | 73.99 | 75.17 | 500 | 69.2 |
| C2 | Eltex PPC KV 276 Control A | | 70.25 | 75.11 | 458 | 69.2 |
| C3 | Eltex PPC KV 276 Control A | | 71.24 | 75.71 | 419 | 70.4 |
| C4 | Borealis PP RE420M0 Control B | | 70.96 | 78.84 | 466 | 67.3 |
| C5 | Borealis PP RE420M0 Control B | | 68.73 | 79.4 | 401 | 72.1 |
| 1 | 5 ppm Cu | A | 66.11 | 75.28 | 439 | 67 |
| 2 | 50 ppm Cu | A | 53.90 | 61.18 | 386 | 72 |
| 3 | 5 ppm coarse carbon | A | 56.73 | 75.85 | 366 | 74.3 |

TABLE 2-continued

Comparison of L* and Reheating Characteristics

| Sample No. | Target Formulation | Control Polymer | Granule L* | Plaque L* | Through-heat to 80° C. (sec) | Through-heat in 300 secs (° C.) |
|---|---|---|---|---|---|---|
| | black | | | | | |
| 4 | 10 ppm coarse carbon black | A | 48.5 | 72.64 | 334 | 76.7 |
| 5 | 20 ppm coarse carbon black | A | 37.83 | 37.30 | 331 | 76.7 |
| 6 | 10 ppm Elftex 254 CB | B | 46.85 | 53.73 | 325 | 77.2 |
| 7 | 2 ppm 20 nm fine CB N | B | 61.51 | 73.11 | 443 | 69.1 |
| 8 | 5 ppm 20 nm fine CB N | B | 53.96 | 61.32 | 442 | 69.2 |
| 9 | 10 ppm fine carbon black | B | 45.82 | 53.93 | 336 | 76.4 |
| 10 | 25 ppm fine carbon black | B | 39.10 | 31.95 | 336 | 76.7 |
| 11 | 50 ppm fine carbon black | B | 26.32 | 15.53 | 292 | 80.4 |
| 12 | Infra-red dye-10 ppm Avecia pro-jet 830 NP | B | 63.54 | 75.07 | 407 | 71.6 |
| 13 | 10 ppm Fe | A | 64.80 | 72.88 | 412 | 71 |
| 14 | 100 ppm 100 nm Fe N | A | 47.48 | 49.49 | 341 | 75.4 |
| 15 | 200 ppm M Fe N | A | 70.21 | 78.94 | 498 | 66.9 |
| 16 | 10 ppm Fe(III) oxide | B | 58.36 | 71.54 | 413 | 71.6 |
| 17 | 10 ppm graphite EP 1020 | B | 64.15 | 72.16 | 389 | 72.9 |
| 18 | 10 ppm 1-2micron graphite | B | 63.89 | 72.94 | 366 | 73.8 |
| 19 | 200 ppm M Mn N | A | 62.44 | 71.00 | 417 | 70.6 |
| 20 | 2.5 ppm Sb via ATG/$H_3PO_2$ | A | 67.22 | 76.15 | 436 | 70 |
| 21 | 5 ppm Sb via ATG/$H_3PO_2$, 10 ppm Ti | A | 59.84 | 67.64 | 418 | 70.4 |
| 22 | 5 ppm fine Sb | B | 68.00 | 75.65 | 405 | 71.6 |
| 23 | 10 ppm Sb via ATG/$H_3PO_2$ | A | 59.91 | 69.20 | 388 | 72.7 |
| 24 | 10 ppm fine Sb | B | 63.37 | 72.32 | 380 | 73.6 |
| 25 | 20 ppm Sb via ATG/$H_3PO_2$ | B | 57.74 | 69.44 | 349 | 75 |
| 26 | 30 ppm Sb via ATG/$H_3PO_4$ | B | 54.27 | 65.01 | 337 | 76.2 |
| 27 | 50 ppm Sb via ATG/$H_3PO_3$ N | A | 64.48 | 71.17 | 327 | 77.3 |
| 28 | 50 ppm Sb via ATG/TNPP low N | A | 73.62 | 78.27 | 457 | 68.8 |
| 29 | 50 ppm Sb via ATG/TNPP/ $H_3PO_2$ | A | 70.19 | 77.89 | 457 | 68.8 |
| 30 | 50 ppm fine Sb | B | 46.58 | 51.69 | 315 | 78.8 |
| 31 | 100 ppm Sb/P | A | 58.39 | 68.8 | 390 | 72.2 |
| 32 | 50 ppm Sb via ATA/$H_3PO_2$ N | A | 56.30 | 65.67 | 394 | 72.2 |
| 33 | 50 ppm Sb via $H_3PO_3$ N | A | 58.86 | 69.92 | 415 | 70.6 |
| 34 | 5 ppm coarse Sb | A | 66.39 | 75.85 | 391 | 72.7 |
| 35 | 10 ppm coarse Sb | A | 64.3 | 72.64 | 365 | 74.4 |
| 36 | 25 ppm coarse Sb | A | 57.31 | 64.25 | 329 | 77.2 |
| 37 | 100 ppm coarse Sb | A | 42.19 | 39.68 | 287 | 81.8 |
| 38 | 200 ppm M Sb N | A | 40.43 | 39.29 | 301 | 79.6 |
| 39 | 10 ppm Sb via $Sb_2O_3$/$H_3PO_2$ | B | 66.3 | 76.81 | 417 | 71 |
| 40 | 200 ppm Ti N | A | 29.35 | 20.87 | 352 | 74.5 |
| 41 | 100 ppm 100 nm W N | A | 58.98 | 68.73 | 415 | 70.8 |

M/b: masterbatch.
N: nucleated.
M: milled.
ATG: antimony triglycolate.
ATA: antimony triacetate.
TNPP: trisnonylphenyl phosphite.
$H_3PO_3$ = phosphorous acid,
$H_2PO_3$ = Hypophosphorous acid

TABLE 3

Polypropylene compositions with reheating agents according to the invention preferably result in at least a 10% reduction in reheating time, more preferably at least a 25% reduction in reheating time, and most preferably at least a 35% reduction in reheating time, as compared to the reheating time for the control composition. Thus, from Tables 2 and 3, the polypropylene compositions with reheating agents that had reheat times to 80° C. of 375 seconds and under, and particularly 300 seconds and under were most advantageous.

The invention has been illustrated by detailed description and examples of the preferred embodiment. Various changes in form and detail will be within the skill of persons skilled in the art. Therefore, the invention must be measured by the claims and not by the description of the examples or the preferred embodiments.

We claim:

1. A method for forming a polypropylene article, comprising:
    (a) forming a sheet from a polypropylene composition containing a reheating agent selected from metal particles that intrinsically absorb radiation in the wavelength region of 500 nm to 2000 nm;
    (b) reheating the sheet to a desired temperature, wherein the time for the sheet to reach the desired temperature is less than the time for reheating a control sheet of equivalent dimensions that is formed from the polypropylene composition in the absence of the reheating agent to the desired temperature; and
    (c) forming the reheated sheet into the polypropylene article.

2. A method for forming a polypropylene article, comprising:
    (a) forming a sheet from a polypropylene composition containing a reheating agent, wherein the reheating agent comprises carbon black, graphite or an infra-red dye in the form of particles incorporated into the polypropylene composition in an amount in the range of 2 ppm to 1000 ppm;
    (b) reheating the sheet to a desired temperature, wherein the time for the sheet to reach the desired temperature is less than the time for reheating a control sheet of equivalent dimensions that is formed from the polypropylene composition in the absence of the reheating agent to the desired temperature; and
    (c) forming the reheated sheet into the polypropylene article.

3. The method of claim 1, wherein the reheating agent is incorporated into the polypropylene composition in the form of particles having sizes in the range of 10 nm to 100 microns and in an amount in the range of 2 ppm to 1000 ppm.

4. The method of claim 1 or 2, wherein the reheating agent is incorporated into the polypropylene composition in the form of particles having sizes in the range of 10 nm to 10 microns and in an amount in the range of 2 ppm to 50 ppm.

5. The method of claim 1, wherein the reheating agent is generated within the polypropylene composition by in situ chemical reduction of a metal compound with a reducing agent.

6. The method of claim 5, wherein the metal compound contains one or more of antimony, titanium, copper, manganese, iron and tungsten, and the reducing agent is selected from the group consisting of one or more of organic phosphorous acids, inorganic phosphorous acids, tannic, gallic, and pyrogallic acids, hydrazine, sulphites, tin II salts and nickel hydroxide.

7. The method of claim 5, wherein the metal compound is antimony triglycolate and the reducing agent is hypophosphorous acid.

8. The method of claim 1, wherein the reheating agent is incorporated into the polypropylene composition in the form of particles having sizes in the range of 10 nm to 100 microns and in an amount in the range of 50 ppm to 25,000 ppm to form a polypropylene masterbatch.

9. A three dimensional polypropylene article made according to the method of claim 1 or 2.

10. he method of claim 2, wherein the reheating agent is incorporated into the polypropylene composition in the form of particles having sizes in the range of 10 nm to 100 microns.

11. The method of claim 2, wherein the reheating agent is incorporated into the polypropylene composition in an amount in the range of from 2 ppm to 350 ppm.

12. The method of claim 2, wherein the reheating agent is incorporated into the polypropylene composition in an amount in the range of from 2 ppm to 50 ppm.

13. The method of claim 5, wherein the metal compound is antimony trioxide.

14. The method of claim 5, wherein the metal compound is antimony trioxide and the reducing agent is hypophosphorous acid.

* * * * *